J. H. FUNDERBURG.
NUT LOCK.
APPLICATION FILED NOV. 17, 1910.
1,031,639.
Patented July 2, 1912.
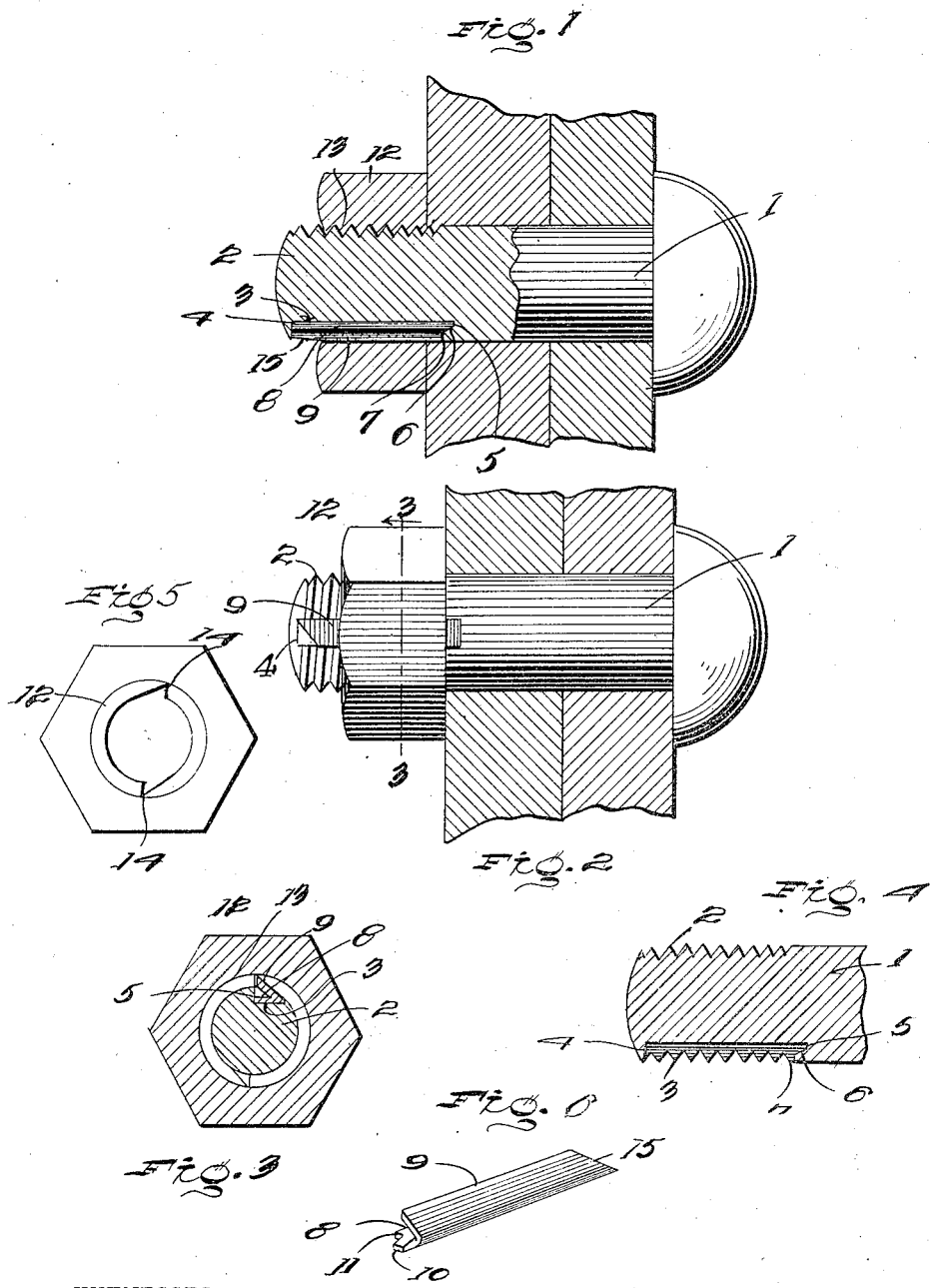

UNITED STATES PATENT OFFICE.

JAMES H. FUNDERBURG, OF LAKE CHARLES, LOUISIANA.

NUT-LOCK.

1,031,639.

Specification of Letters Patent.

Patented July 2, 1912.

Application filed November 17, 1910. Serial No. 592,894.

*To all whom it may concern:*

Be it known that I, JAMES H. FUNDERBURG, a citizen of the United States, residing at Lake Charles, in the parish of Calcasieu and State of Louisiana, have invented certain new and useful Improvements in Nut-Locks, of which the following is a specification, reference being had therein to the accompanying drawing.

This invention relates to nut and bolt locks and the principal object of the same is to provide simple bolt carrying means which will permit a nut to be readily tightened on the bolt but will prevent a reverse movement of the nut on the bolt.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view partly in longitudinal section and partly in elevation of the improved nut and bolt lock. Fig. 2 is a view in elevation thereof. Fig. 3 is a transverse sectional view taken on the line 3—3, Fig. 2, looking in the direction of the arrow. Fig. 4 is a fragmentary longitudinal sectional view of the bolt forming a part of this invention. Fig. 5 is a view in elevation of the nut forming a part of this invention. Fig. 6 is a detail perspective view of the device for locking the nut and bolt together.

Referring to the accompanying drawings by numerals, it will be seen that the improved nut and bolt lock comprises a bolt 1 the threaded portion 2 of which is provided with a longitudinal groove 3. The outer end of the groove 3 is closed by the flat abutment wall 4, and the inner end thereof terminates in a recess 5 having a beveled wall 6 that extends from a flat shoulder 7 at the entrance to said recess.

A spring locking key forms a part of this invention, said key being formed of flat resilient metal that is longitudinally folded to provide a flat body 8 which is seated in groove 3 and a spring lip 9 that projects beyond said groove and is on an incline relative to said body. Said body 8 is of substantially the same length as the groove 3 and has a snug fit therein. The inner end of said body is provided with a tapering tongue 10 and a shoulder 11 at the junction of the tongue 10 with the body 8.

The nut 12 used in connection with this invention has its threaded bore 13 provided with longitudinal slots 14.

In assembling the invention, the body 8 is "snapped" into position by rocking the tongue 10 on the shoulder 7 which causes the body 8 and the tongue 10 to be snugly seated in the groove 3 and recess 5. When the body is within the groove 3, the lip 9 projects beyond the said groove and being on an incline relative to said body, it will be seen that the nut 12 when being adjusted to a tight position on the bolt will force the lip 9 onto the body 8 so that said lip will not prevent the nut being tightened. Said lip being resilient, it will be clear that the same will spring to engagement with one of the slots 14 of the nut 12 if an attempt is made to remove the nut, so that the release of the nut is prevented. Preferably the outer end 15 of locking lip 9 is beveled so that the same will offer but slight resistance to the nut being placed on the bolt.

It will be seen from the foregoing that by means of this invention the locking lip 9 is at all times retained in proper position to prevent the accidental release of the nut, and, as is shown more clearly in Fig. 2 of the accompanying drawings, the beveled end of said lip projects beyond the nut when the nut is adjusted to a tight position, so that when necessary or desirable the said lip can be forced onto the body 8 by the use of a suitable tool or implement to permit the nut to be removed from the bolt.

What I claim as my invention is:—

A new article of manufacture comprising a bolt having a longitudinally extending groove formed in one side thereof, said groove terminating in a socket at its inner end, a key positioned in said groove and being formed of a blank sheet comprising a pair of leaves, one of said leaves being adapted to lie snugly upon the bottom of said groove and having a lug carried by the inner end of said leaf, said lug being adapted to fit in said socket, one of said leaves tapering near its outer end from the outer edge thereof to the junction of said leaves thereby forming a gradually tapered end upon said key for allowing a nut to easily glide over said key while being threaded upon said bolt.

In testimony whereof I hereunto affix my signature in presence of two witnesses.

JAMES H. FUNDERBURG.

Witnesses:
JOHN ECKER,
D. E. LYONS.